United States Patent
Nowottnick et al.

(10) Patent No.: US 6,694,227 B2
(45) Date of Patent: Feb. 17, 2004

(54) ARRANGEMENT FOR POSITION ASSIGNMENT OF VEHICLE WHEELS

(75) Inventors: Juergen Nowottnick, Hamburg (DE); Frank Boeh, Rosengarten (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 51 days.

(21) Appl. No.: 10/218,216

(22) Filed: Aug. 13, 2002

(65) Prior Publication Data
US 2003/0043031 A1 Mar. 6, 2003

(30) Foreign Application Priority Data
Aug. 16, 2001  (DE) .......................................... 101 40 146

(51) Int. Cl.$^7$ ................................................. G05B 1/00
(52) U.S. Cl. ................................. 701/1; 701/36; 701/72
(58) Field of Search ................................. 701/1, 72, 36, 701/70, 38, 45, 96, 93, 74; 340/447, 434, 44

(56) References Cited

U.S. PATENT DOCUMENTS

| | | | | |
|---|---|---|---|---|
| 6,112,587 A | * | 9/2000 | Oldenettel | 73/146.5 |
| 6,539,288 B2 | * | 3/2003 | Ishida et al. | 701/1 |
| 6,556,908 B1 | * | 4/2003 | Lu et al. | 701/38 |
| 6,580,365 B2 | * | 6/2003 | Starkey | 340/447 |
| 6,631,317 B2 | * | 10/2003 | Lu et al. | 701/45 |
| 6,654,674 B2 | * | 11/2003 | Lu et al. | 701/36 |

* cited by examiner

Primary Examiner—Richard M. Camby
(74) Attorney, Agent, or Firm—Aaron Walker

(57) ABSTRACT

The invention relates to an arrangement for position assignment of vehicle wheels (2, 4, 6, 8), in which means (3, 5, 7, 9) for detecting the number of rotations and turning direction of the wheel (2, 4, 6, 8) are assigned to each wheel (2, 4, 6, 8). In accordance with two further embodiments, a steering sensor (11) is provided instead of the means for detecting the turning direction of the wheel. In all embodiments, the vehicle is provided with an evaluation unit (10) which, in the case of a curved trajectory of the vehicle (11), performs a vehicle position assignment of the individual wheels (2, 4, 6, 8) with reference to the number of rotations and turning directions detected for each wheel (2, 4, 6, 8) and possibly with reference to the steering direction.

10 Claims, 1 Drawing Sheet

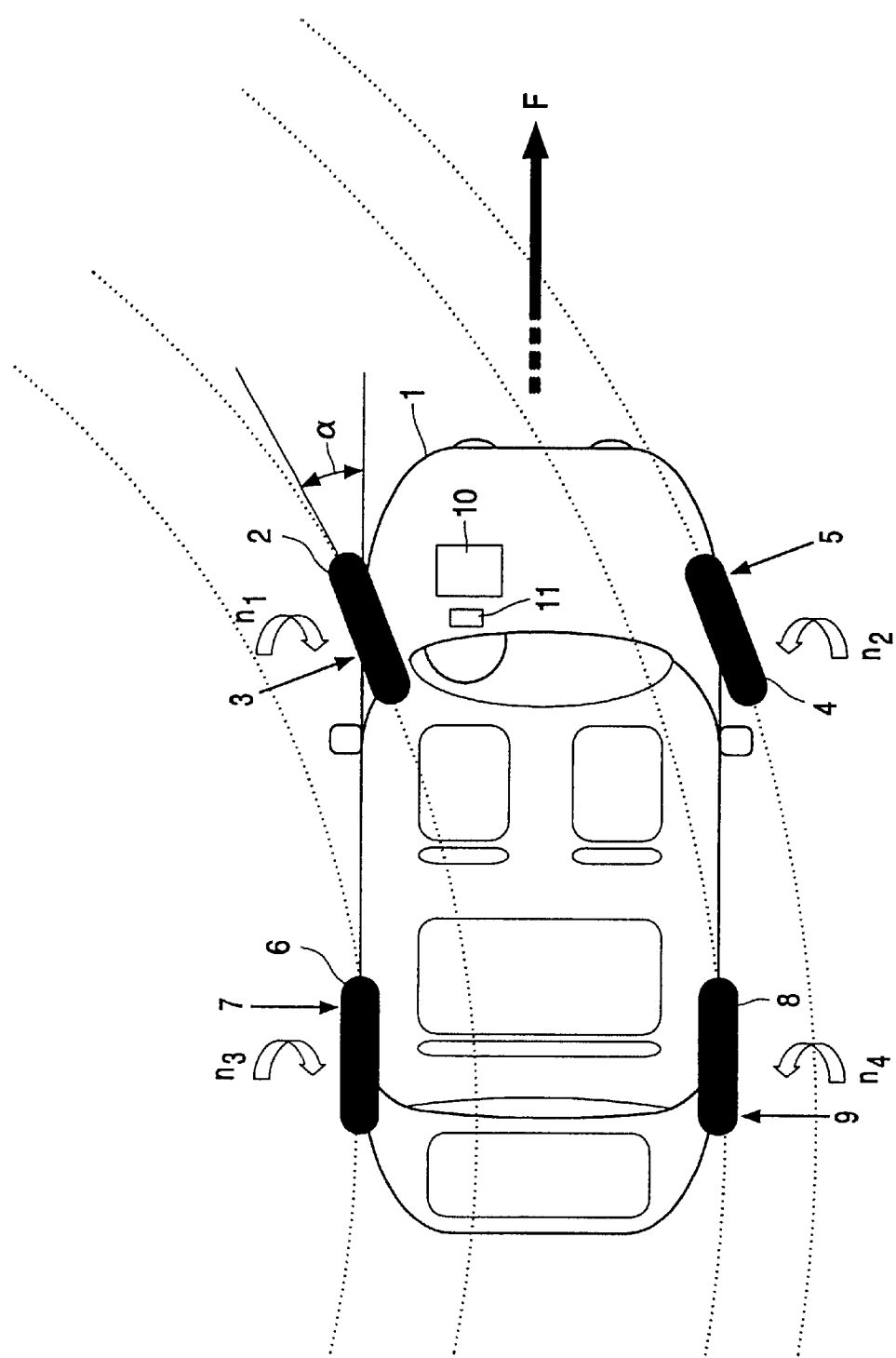

ARRANGEMENT FOR POSITION ASSIGNMENT OF VEHICLE WHEELS

The invention relates to an arrangement for detecting the position of wheels on a vehicle.

The wheels of a vehicle may be turned, i.e. the position of the wheels on the vehicle may be changed. Electronic sub-assemblies such as, for example, tyre pressure sensors, which may be present on the wheels, are permanently assigned to the respective wheel and are thus also turned together with the wheel. The electronic signals supplied by such sensors are centrally evaluated in the vehicle. However, after the wheels have been turned, the position of a given wheel, whose sub-assembly supplies a given signal, is no longer known. However, in the case of, for example, tyre pressure sensors, it is desirable to know the position of the vehicle wheel to which a tyre pressure sensor indicating, for example, a too low air pressure is assigned. It should be indicated in the vehicle that this sensor is situated at, for example, the front left. After the wheels have been turned, this information is, however, no longer available or may be false.

It is therefore desirable to provide an arrangement with which, also after the wheels have been turned, the position of the individual wheels on the vehicle can be detected and a given vehicle position can be assigned to the above-mentioned electronic sub-assemblies.

According to the prior art, arrangements are known in which the electronic sub-assemblies assigned to each wheel transmit their signals at different amplitudes. Due to the tolerances of the sub-assemblies and the required calibration, this method is, however, relatively laborious and not very reliable in practice due to its amplitude sensitivity.

A method of assigning the vehicle wheel position is also known from U.S. Pat. No. 6,112,587, in which angle sensors are provided on the wheels which supply their angle signals to a central evaluation unit at discrete time intervals. Furthermore, the evaluation unit determines the numbers of rotation of the individual wheels by means of HBS sensors that are fixedly provided on the vehicle wheels. These rotation signals, which are supplied by the rotation sensors, are checked in the central unit as to which rotation signal exhibits the same angular offset as the signals supplied by the angle sensors on the wheels. This method is relatively laborious and particularly requires the signals from ABS sensors which are not always available.

It is an object of the invention to provide an arrangement of the type described in the opening paragraph, which operates reliably without rotation sensors on the vehicle.

In accordance with a first embodiment of the invention, this object is achieved by the characteristic features defined in claim 1.

An arrangement for position assignment of vehicle wheels, in which means for detecting the number of rotations and turning direction of the wheel are assigned to each wheel, and in which the vehicle is provided with an evaluation unit which, in the case of a curved trajectory of the vehicle, performs the following vehicle position assignments with reference to the number of rotations and turning directions detected for each wheel:

the wheel having the highest number of rotations is situated at the front of the vehicle, and the position at the front left or at the front right is determined from the turning direction, the wheel having the lowest number of rotations is situated at the rear of the vehicle, and the position at the front left or at the front right is determined from the turning direction, the position assignments of the other two wheels are determined from their turning direction.

In the arrangement according to the invention, means for determining the number of rotations and the turning direction of the wheel are assigned to each wheel. The vehicle is provided with an evaluation unit which, in the case of a curved trajectory of the vehicle, performs a position assignment of the vehicle wheels with reference to the number of rotations and turning directions detected for each wheel by the assigned means.

In such a curved trajectory, the evaluation unit detects the wheel having the highest number of rotations. It is always situated at the front of the vehicle, because the rear axle trails in the case of a curved trajectory. The position of the wheel at the front left or at the front right is determined from the turning direction; when the wheel turns right, it is situated at the front right, when it turns left, it is situated at the front left.

The evaluation unit thus detects the wheel having the lowest number of rotations, which is always at the rear of the vehicle. Here again, the position at either the rear left or at the rear right can be concluded from the turning direction.

There are still two wheels whose position on the vehicle has not yet been assigned. Since these wheels are always positioned diagonally opposite to each other, it is sufficient to detect the turning direction in this case. This detection directly reveals that one of the wheels, which turns right, is situated at the still unoccupied position at the front right or at the rear right and that the other wheel, which turns left, is situated at the still unoccupied position at the front left or rear left.

All of the four positions of the vehicle wheels are thus assigned.

In this method, rotation sensors permanently assigned to the vehicle positions can be dispensed with. Moreover, the arrangement has a high reliability and accuracy because it is independent of analog measuring values. A calibration of the rotation sensors is not required because the evaluation unit performs a central evaluation and purely digital measuring methods are applicable. The number of components is relatively small and thus economical. The rotation sensors and turning direction sensors of the wheels may be used for further tasks within the electronic system of the vehicle.

The above-mentioned object of the invention is achieved by a second embodiment defined in claim 2.

An arrangement for position assignment of vehicle wheels, in which means for detecting the number of rotations of the wheel are assigned to each wheel, in which a steering sensor is provided which supplies a steering signal signalizing the steering direction, and in which the vehicle is provided with an evaluation unit which, in the case of a curved trajectory of the vehicle, performs the following vehicle position assignments with reference to the number of rotations and turning directions and the steering signal detected for each wheel:

in the case of a curved trajectory in a first direction
the wheel having the highest number of rotations is situated at the front of the vehicle, and the position at the front left or at the front right is determined from the steering direction,
the wheel having the lowest number of rotations is situated at the rear of the vehicle, and the position at the front left or at the front right is determined from the steering direction, in the case of a curved trajectory in a second direction
the wheel having the highest number of rotations is situated at the front of the vehicle, and the position at the front left or at the front right is determined from the steering direction, the wheel having the lowest number of rotations is situated at the rear of the vehicle, and the position at the rear left or at the rear right is determined from the steering direction.

In this embodiment of the invention, the means assigned to each wheel only detect the number of rotations and not the turning direction of the wheel. Instead, the vehicle is provided with a steering sensor, which supplies a steering signal signaling the relevant steering direction and thus indicating in which direction the vehicle is steered in a curved trajectory.

In accordance with the second embodiment of the invention, the vehicle wheel positions are also assigned on the basis of this information.

The evaluation unit determines this vehicle position in accordance with the following rules.

The wheel having the highest number of rotations is first detected by means of the steering sensor in the case of a curved trajectory in a first direction, in which it is unimportant whether a left or a right turn is concerned. This wheel is situated at the front of the vehicle. The position at the front left or at the front right can be directly concluded from the steering direction. When, for example, a left turn is concerned, this wheel is situated at the front right; when, in contrast, a right turn is concerned, it is situated at the front left.

The wheel having the lowest number of rotations is assigned to the rear axle of the vehicle. Here again, it can be directly concluded from the steering direction whether the wheel is situated at the rear left or at the rear right. When a left turn is concerned, the wheel is situated at the rear left; when, in contrast, a right turn is concerned, it is situated at the rear right.

Subsequently, the evaluation unit waits until a curved trajectory in a second direction, i.e. the direction opposite to the first direction is taken. Then, the evaluation unit evaluates the signals of the means for detecting the number of rotations as follows.

Again, the wheel having the highest number of rotations is detected, which wheel is situated at the front of the vehicle. Dependent on the steering direction, it may be assigned to the position at the front left or at the front right, as described above. However, since a curved trajectory in the opposite direction is now concerned, the relevant other position, which has hitherto been unoccupied, is occupied.

In a corresponding manner, the position of the wheel having the lowest number of rotations at the rear of the vehicle is determined.

The arrangement in accordance with the second embodiment of the invention has the same advantages as that of the first embodiment, in which, additionally, means for detecting the direction of the wheels can be dispensed with. It is true that a steering sensor is required but such a sensor will be available anyway in electrically operating steering systems which find an increasingly wider application. Such a steering sensor is available anyway in vehicles with ESP or similar systems.

In accordance with a third embodiment of the invention, the above-mentioned object is achieved by the characteristic features defined in claim 3.

An arrangement for position assignment of vehicle wheels, in which means for detecting the number of rotations of the wheel are assigned to each wheel, in which a steering sensor is provided, which supplies a steering signal signaling the steering direction, and in which the vehicle is provided with an evaluation unit which, in the case of a curved trajectory of the vehicle having a steering lock exceeding a predetermined steering lock, performs the following vehicle position assignments with reference to the number of rotations and turning directions and the steering signal detected for each wheel:

the wheel having the highest number of rotations is situated at the front of the vehicle, and the position at the front left or at the front right is determined from the steering direction, the wheel having the lowest number of rotations is situated at the rear of the vehicle, and the position at the front left or at the front right is determined from the steering direction, the wheel having the second highest number of rotations is situated at the rear of the vehicle, and the position at the rear left or at the rear right is determined from the steering direction, the wheel having the second lowest number of rotations is situated at the front of the vehicle, and the position at the front left or at the front right is determined from the steering direction.

The third embodiment of the invention operates similarly as the second embodiment, using means on the wheels that detect only the number of rotations but do not detect the turning direction of each wheel. In the third embodiment of the invention, the arrangement determines the positions of the wheels in a single curved trajectory, independent of their direction. The direction must, however, be known for a correct position assignment of the wheels.

The evaluation unit first detects the wheel having the highest number of rotations, which wheel is situated at the front of the vehicle. It is known from the steering direction whether it is situated at the front right or at the front left.

The wheel having the lowest number of rotations is situated at the rear of the vehicle, while the position on the rear axle can be concluded from the steering direction.

In so far, the method used by the evaluation unit is similar to that defined in the second embodiment of the invention.

In contrast to the second embodiment, however, the assignments of the two other wheels are performed in the same curved trajectory when using the third embodiment.

In this embodiment, the wheel having the second highest number of rotations is situated at the rear of the vehicle, while it can be concluded from the steering direction whether it is situated at the rear left or at the rear right. In a corresponding manner, the wheel having the second highest number of rotations may be assigned to the correct position on the front axle.

This method is only admissible when sufficient differences in the number of rotations are obtained between the wheels on one of the axles. Therefore, the condition is to be imposed that the steering lock with which the curve is taken exceeds a predetermined steering lock. Only then can this condition be complied with.

The second and third embodiments of the invention have the same advantages as the first embodiment.

In accordance with an embodiment as defined in claim 4, all of the three embodiments of the invention comprise means in the form of a sensor on each wheel for detecting the number of rotations or the turning direction of the relevant wheel. The central evaluation unit can determine the rotation values from the sensor signal.

In the second and third embodiments of the arrangement according to the invention, a plausibility test as defined in claim 5 may be performed as to whether a vehicle wheel position assignment performed in a previous step was also performed for another wheel in a subsequent step. This is of course inadmissible. In such a case, in which the plausibility test is not positive, it is advantageous, as in a further embodiment of the invention as defined in claim 10, to reject the new assignments and, instead, to further consider the previously determined position assignments as being valid.

For the arrangement in accordance with the first embodiment, further advantageous plausibility tests as defined in claims 6 to 8 are performed, in which a previous position assignment also remains advantageously valid in the case of a negative test result.

The three embodiments of the invention will hereinafter be elucidated with reference to the sole FIGURE which is a diagrammatic plan view of a vehicle.

The vehicle 1 has 4 wheels, 2, 4, 6 and 8, which are assigned to the relevant four positions of the vehicle. The wheel 2 is assigned to the position at the front left, the wheel 4 is assigned to the position at the front right, the wheel 6 is assigned to the position at the rear left and the wheel 8 is assigned to the position at the rear right.

Each wheel comprises means 3, 5, 7 and 9, respectively, for detecting the number of rotations and, in the second and third embodiment of the invention, also the turning direction.

These means for detecting the number of rotations and/or turning direction are fixedly assigned to each wheel, i.e. they are mounted on these wheels.

The means 3, 5, 7 and 9 may comprise rotation sensors for detecting the number of rotations, which sensors directly transmit the relevant numbers of rotations to a central evaluation unit 10.

However, the means 3, 5, 7 and 9 may also comprise angle acceleration sensors or the like, which supply measuring signals to the central evaluation unit 10 which determines the relevant number of rotations of the wheels from these signals.

The FIGURE shows that the means 3 for determining the number of rotations $n_1$ of the wheel 2 are assigned to the wheel 2. In a corresponding manner, the means 5 determine the number of rotations $n_2$ of the wheel 4, the means 7 determine the number of rotations $n_3$ of the wheel 6 and the means 9 determine the number of rotations $n_4$ of the wheel 8.

It is assumed that the vehicle is moving in the driving direction F as shown in the FIGURE and takes a left turn.

The modes of operation of the arrangements in accordance with the three embodiments will now be elucidated.

In the first embodiment of the invention, the sensors 3, 5, 7 and 9 do not only detect the number of rotations of each wheel but also their turning direction.

In the left turn taken by the vehicle, as shown by way of example in the FIGURE, the following assignments are performed by means of the central evaluation unit 10.

The wheel having the highest number of rotations is detected. In the embodiment, this is the wheel 4 with the number of rotations $n_2$. Due to the geometrical conditions, the wheel having the highest number of rotations is always situated at the front of the vehicle in the case of a curved trajectory. The sensor 5 of the wheel 4 that was initially detected to have the highest number of rotations also supplies information about the turning direction, i.e. a right turn of the wheel in the embodiment shown in the FIGURE. From this it is thus already known that this wheel is situated at the front right.

Subsequently, the evaluation unit 10 detects the wheel having the lowest number of rotations, which is the wheel 6 in this case, which rotates at the number of rotations $n_3$ determined by the means 7. Here again, it is initially only known that, due to the geometrical conditions, the wheel is situated on the rear axle of the vehicle. However, the sensor 7 further supplies information about the turning direction, in this example to the left, so that it can be directly concluded that the wheel 6 is situated at the rear left of the vehicle.

In this phase, only the position assignments of two wheels are still unknown.

These two wheels, i.e. wheels 2 and 8 in the embodiment shown in the FIGURE, and the sensor signals supplied by the sensors 3 and 9 and detected by these wheels, are situated at the two other, still free positions at the front left and at the rear right. Since the wheels have opposite turning directions in these two positions, the position of the wheels can be directly established from the turning directions supplied by the two sensors 3 and 9.

In a single curved trajectory, a position assignment of the 4 wheels 2, 4, 6 and 8 to the four vehicle positions has then succeeded.

In this first embodiment, plausibility tests may be advantageously performed, in which it can be checked, for example, whether the wheels having the highest or lowest number of rotations have different turning directions, which must be the case for reasons of geometry. Furthermore, it can be checked whether the two wheels remaining after assignment of the wheels having the lowest and highest number of rotations have different turning directions, which should also be the case. Furthermore, it can be established whether the largest and the smallest detected rotation value deviate from the next smaller or next larger value by a minimal difference.

These rotation differences may be further utilized for determining the assignment accuracy. The larger the rotation differences, the larger the assignment accuracy.

The mode of operation of the arrangement according to the invention in accordance with the second embodiment will now be elucidated with reference to the sole FIGURE.

The sensors 3, 5, 7 and 9 of the wheels 2, 4, 6 and 8 only supply a rotation signal in the second embodiment of the invention. In the second embodiment of the invention, the evaluation unit 10 does thus not know the turning directions of the individual wheels.

Instead, however, the vehicle is provided with a steering sensor 11 which supplies a signal from which the evaluation unit 10 determines which steering direction is concerned, i.e. whether the vehicle takes a left or a right turn.

From the signals of the sensors 3, 5, 7 and 9 and the signal of the steering sensor 11, the evaluation unit 10 can determine the vehicle positions of the wheels 2, 4, 6 and 8 as follows.

Initially, the wheel having the highest number of rotations is detected in the case of a curved trajectory in a first direction, in which it does not play any role whether a left turn or a right turn is concerned. For the reasons mentioned above, this wheel is situated at the front of the vehicle. The position at the front left or at the front right can be concluded from the steering direction. When, for example, a left turn is concerned, as is shown in the FIGURE, the wheel having the highest number of rotations is at the front right.

The wheel having the lowest number of rotations is situated at the rear, i.e. at the rear left in the case of a steering direction to the left.

The position assignments in the case of a curved trajectory in the first direction are thereby terminated. Subsequently, the evaluation unit 10 waits until a turn in the opposite direction is taken. Then, the wheels having the highest and lowest number of rotations are detected in a corresponding manner again and their positions on the vehicle can be concluded again from the steering direction which is then the opposite direction.

In this second embodiment of the invention, the turning direction sensors on the wheels 2, 4, 6 and 8 can be dispensed with. The steering sensor 11 may be present in the vehicle anyway, for example, in vehicles with anti-slip programs.

In the third embodiment of the invention, it can be ignored that two turns in opposite directions must be taken in the second embodiment of the arrangement. However, in the arrangement in accordance with the third embodiment, a minimal steering lock must be provided in order that the four wheels have sufficiently different numbers of rotation. When there is such a steering lock, the vehicle positions of the wheels are detected as follows by means of the arrangement in accordance with the third embodiment.

As already explained above, the wheel having the highest number of rotations is assignable with reference to the steering direction. The same applies to the wheel having the lowest number of rotations. Then two wheels remain which are not assigned. One of them is the wheel having the second highest number of rotations, i.e. wheel 8 in the FIGURE. In the known steering direction, to the left in the FIGURE, it is directly known that this wheel is situated at the rear right. This also results from the geometrical conditions. For the same reasons, the wheel having the second lowest number of rotations is situated at the front of the vehicle, i.e. at the front left in the example shown in the FIGURE.

Also for the arrangement in accordance with the second or third embodiment, a plausibility test may be performed as to whether a wheel position assignment performed in a previous test was also performed for another wheel in a subsequent step.

The plausibility tests of the three embodiments have in common that the current assignment result is advantageously rejected in the case of a negative result of the plausibility tests and that a previous assignment result is further considered to be valid.

All of the three embodiments of the invention have in common that rotation sensors on the vehicle, for example, ABS sensors can be dispensed with.

The sensors 3, 5, 7 and 9 as well as the evaluation unit 10 and possibly also the sensor 11 may operate in a purely digital manner so that a great reliability and accuracy is obtained because there are no analog measuring values. The same applies to the rotation sensors which do not require any calibration.

The accuracy of the rotation sensors is also adequate for the arrangements according to the invention. For example, for an assumed tyre circumference of 150 cm and a steering lock α of 20 degrees, a minimal path difference of 9 cm between the tyres can be detected. Current angle sensors and rotation sensors operate, however, with an accuracy of less than 4 cm. This estimation shows that the detected path differences and hence the corresponding differences in the number of rotations are sufficiently large, also when taking the tolerances of the angle and rotation sensors into account, so as to determine the different numbers of rotation of the wheels and to be able to perform a flawless position assignment.

What is claimed is:

1. An arrangement for position assignment of vehicle wheels (2, 4, 6, 8), in which means (3, 5, 7, 9) for detecting the number of rotations and turning direction of the wheel (2, 4, 6, 8) are assigned to each wheel (2, 4, 6, 8), and in which the vehicle (1) is provided with an evaluation unit (10) which, in the case of a curved trajectory of the vehicle (1), performs the following vehicle position assignments with reference to the number of rotations and turning directions detected for each wheel (2, 4, 6, 8):

the wheel (2, 4, 6, 8) having the highest number of rotations is situated at the front of the vehicle (1), and the position at the front left or at the front right is determined from the turning direction, the wheel (2, 4, 6, 8) having the lowest number of rotations is situated at the rear of the vehicle (1), and the position at the front left or at the front right is determined from the turning direction, the position assignments of the other two wheels (2, 4, 6, 8) are determined from their turning direction.

2. An arrangement for position assignment of vehicle wheels (2, 4, 6, 8), in which means (3, 5, 7, 9) for detecting the number of rotations of the wheel (2, 4, 6, 8) are assigned to each wheel (2, 4, 6, 8), in which a steering sensor (11) is provided which supplies a steering signal signalizing the steering direction, and in which the vehicle (1) is provided with an evaluation unit (10) which, in the case of a curved trajectory of the vehicle, performs the following vehicle position assignments with reference to the number of rotations and turning directions detected for each wheel (2, 4, 6, 8):

in the case of a curved trajectory in a first direction the wheel (2, 4, 6, 8) having the highest number of rotations is situated at the front of the vehicle (1), and the position at the front left or at the front right is determined from the steering direction, the wheel (2, 4, 6, 8) having the lowest number of rotations is situated at the rear of the vehicle (1), and the position at the front left or at the front right is determined from the steering direction, in the case of a curved trajectory in a second direction the wheel (2, 4, 6, 8) having the highest number of rotations is situated at the front of the vehicle (1), and the position at the front left or at the front right is determined from the steering direction, the wheel (2, 4, 6, 8) having the lowest number of rotations is situated at the rear of the vehicle (1), and the position at the rear left or at the rear right is determined from the steering direction.

3. An arrangement for position assignment of vehicle wheels (2, 4, 6, 8), in which means (3, 5, 7, 9) for detecting the number of rotations of the wheel (2, 4, 6, 8) are assigned to each wheel (2, 4, 6, 8), in which a steering sensor (11) is provided which supplies a steering signal signalizing the steering direction, and in which the vehicle (1) is provided with an evaluation unit (10) which, in the case of a curved trajectory of the vehicle (1) having a steering lock exceeding a predetermined steering lock, performs the following vehicle position assignments with reference to the number of rotations and turning directions and the steering signal detected for each wheel (2, 4, 6, 8):

the wheel (2, 4, 6, 8) having the highest number of rotations is situated at the front of the vehicle (1), and the position at the front left or at the front right is determined from the steering direction, the wheel (2, 4, 6, 8) having the lowest number of rotations is situated at the rear of the vehicle (1), and the position at the front left or at the front right is determined from the steering direction, the wheel (2, 4, 6, 8) having the second highest number of rotations is situated at the rear of the vehicle (1), and the position at the rear left or at the rear right is determined from the steering direction, the wheel (2, 4, 6, 8) having the second lowest number of rotations is situated at the front of the vehicle (1), and the position at the front left or at the front right is determined from the steering direction.

4. An arrangement as claimed in claim 1, characterized in that the means (3, 5, 7, 9) for detecting the number of rotations of the wheel (2, 4, 6, 8) comprise an angle sensor assigned to each wheel (2, 4, 6, 8) and an electronic unit arranged in the vehicle, which electronic unit determines the respective rotation values from the sensor signals of the angle sensors arranged on the wheels.

5. An arrangement as claimed in claim 2, characterized in that the evaluation unit (10) performs a plausibility test as to whether a vehicle wheel position assignment performed in a previous step was also performed for another wheel in a subsequent step.

6. An arrangement as claimed in claim 1, characterized in that the evaluation unit (10) performs a plausibility test as to whether the wheels (2, 4, 6, 8) having the highest and lowest number of rotations have different turning directions.

7. An arrangement as claimed in claim 1, characterized in that the evaluation unit (10) performs a plausibility test as to whether the two wheels (2, 4, 6, 8) remaining after assignment of the wheels (2, 4, 6, 8) with the lowest and highest number of rotations have different turning directions.

8. An arrangement as claimed in claim 1, characterized in that the evaluation unit (10) performs a plausibility test as to whether the largest and the smallest detected rotation value deviate from the next smaller or next larger rotation value by a minimal difference.

9. An arrangement as claimed in claim 8, characterized in that the evaluation unit (10) utilizes the differences found for determining the assignment accuracy.

10. An arrangement as claimed in claim 5, characterized in that the evaluation unit (10) rejects all new assignments in the case of a negative result of the plausibility test, and that the previous position assignments remain valid.

* * * * *